United States Patent
Lee

(10) Patent No.: US 9,733,897 B2
(45) Date of Patent: Aug. 15, 2017

(54) METHOD AND APPARATUS OF SEARCHING CONTENT

(71) Applicant: Samsung Electronics Co., Ltd., Gyeonggi-do (KR)

(72) Inventor: Hwajun Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/876,279

(22) Filed: Oct. 6, 2015

(65) Prior Publication Data

US 2016/0098246 A1    Apr. 7, 2016

(30) Foreign Application Priority Data

Oct. 6, 2014  (KR) .................. 10-2014-0134042

(51) Int. Cl.
  *G06F 17/00* (2006.01)
  *G06F 3/16* (2006.01)
  *G06F 17/30* (2006.01)

(52) U.S. Cl.
  CPC ........ *G06F 3/167* (2013.01); *G06F 17/30775* (2013.01)

(58) Field of Classification Search
  CPC ..... G06F 17/30775; G06F 3/165; G06F 3/167
  See application file for complete search history.

(56) References Cited

U.S. PATENT DOCUMENTS 5,692,058 A * 11/1997 Eggers .................... H04R 5/04
                                                                    381/107
2014/0168390 A1    6/2014 Cho et al.

FOREIGN PATENT DOCUMENTS

JP    2009-055541    3/2009
JP    2009-111637    5/2009

* cited by examiner

*Primary Examiner* — Joseph Saunders, Jr.
(74) *Attorney, Agent, or Firm* — The Farrell Law Firm, P.C.

(57) ABSTRACT

An apparatus and method are provided for searching content. The electronic device includes a display; an audio processing unit; and a controller configured to control the audio processing unit to output sound of first content from a foreground of the display at a preset foreground volume, detect a request to search for second content, and in response to the detected request, control the audio processing unit to simultaneously output sound of the second content from a background of the display at a preset background volume with the sound of the first content. The preset foreground volume differs from preset background volume.

16 Claims, 9 Drawing Sheets

METHOD AND APPARATUS OF SEARCHING CONTENT

PRIORITY

This application claims priority under 35 U.S.C. §119(a) to Korean Patent Application Serial No. 10-2014-0134042, which was filed in the Korean Intellectual Property Office on Oct. 6, 2014, the entire disclosure of which is incorporated herein by reference.

BACKGROUND OF THE INVENTION

1. Field of the Invention

The present invention relates generally to a method and apparatus for searching content, and more particularly, to a method and apparatus for effectively searching and simultaneously outputting a plurality of sound content.

2. Description of the Related Art

When conventional electronic devices output sound-related content, because a plurality of sound content are not simultaneously output, regardless of whether multiple applications are being executed, it is difficult for users of the conventional electronic devices to perform content searching and application management. For example, when an application (e.g., a music playback application) is being executed and content which may run on the application (e.g., music) is being played back, if the user tries to preview different content during a search, the currently played content stops and the different content is played independently. Basically, to preview new content in a conventional electronic device, a user first stops content that this currently playing before previewing the new content, which inconveniences the user.

In addition, in a multi-tasking environment where a plurality of applications are executed, when conventional electronic devices execute one of the application in the foreground, the conventional electronic devices do not output sounds of other applications running in the background. As such, conventional electronic devices output only a single sound corresponding to one application, which often inconveniences users trying to simultaneously manage applications that execute sound-related content. For example, when a conventional electronic device executes a call function, if a user of the conventional electronic device also executes a Digital Multimedia Broadcasting (DMB) viewing application to, the electronic device outputs only sounds for the call function, but does not output sounds for the DMB function.

SUMMARY OF THE INVENTION

The present invention has been made to address at least the problems and/or disadvantages described above and to provide at least the advantages described below.

Accordingly, an aspect of the present invention is to provide an apparatus and method in which, when sound-related content is running, if additional sound-related content is selected, content in the running sound-related content and the additional sound-related content are output simultaneously.

Another aspect of the present invention is to provide an apparatus and method that output content running in the foreground and the background with different sound volumes.

Another aspect of the present invention is to provide an apparatus and method that simultaneously executes foreground and background tasks, on the respective areas, with respective preset sound volumes that differ from each other.

In accordance with an aspect of the present invention, an electronic device is provided, which includes a display; an audio processing unit; and a controller configured to control the audio processing unit to output sound of first content from a foreground of the display at a preset foreground volume, detect a request to search for second content, and in response to the detected request, control the audio processing unit to simultaneously output sound of the second content from a background of the display at a preset background volume with the sound of the first content. The preset foreground volume differs from preset background volume.

In accordance with another aspect of the present invention, a method is provided for searching content. The method includes outputting sound of first content from a foreground at a preset foreground volume; detecting a request to search for second content; and in response to the detected request, simultaneously outputting sound of the second content from a background at a preset background volume with the sound of the first content. The preset foreground volume differs from preset background volume.

In accordance with another aspect of the present invention, a method is provided for searching content in a multi-tasking environment. The method includes outputting a sound of a first task from a foreground at a preset foreground volume; and simultaneously outputting a sound of a second task from a background main at a preset background volume with the sound of the first task from the foreground. The preset foreground volume is greater than the preset background volume.

BRIEF DESCRIPTION OF THE DRAWINGS

The above and other aspects, features and advantages of certain embodiments of the present invention will become more apparent from the following detailed description taken in conjunction with the accompanying drawings, in which.

DETAILED DESCRIPTION OF EMBODIMENTS

Figure 1:
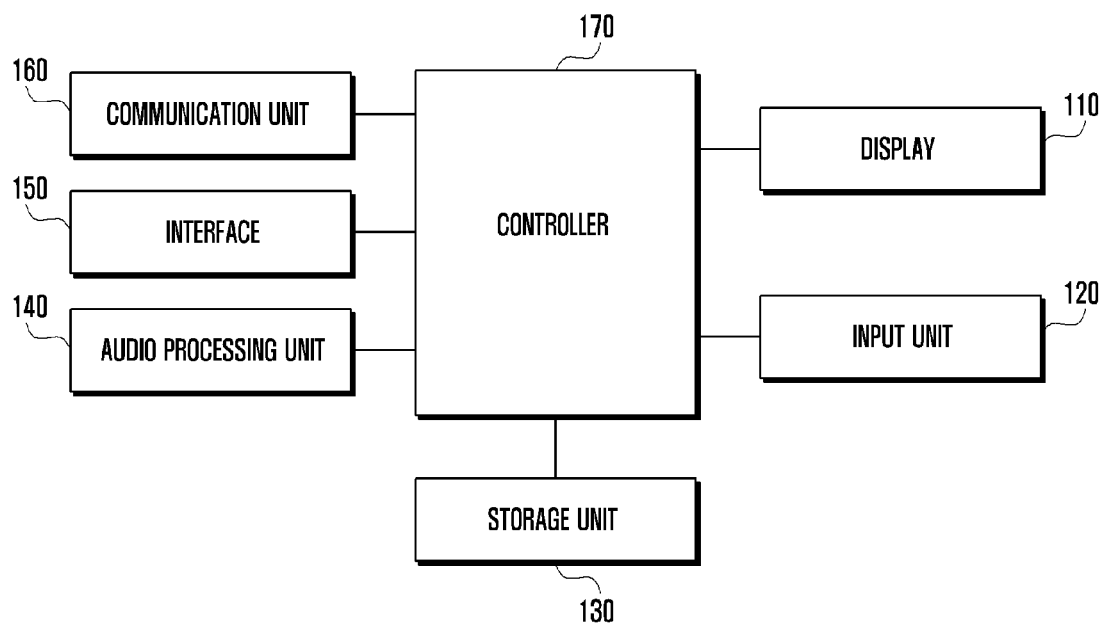
FIG. 1 illustrates an electronic device according to an embodiment of the present invention.

Hereinafter, various embodiments of the present invention will be described in detail with reference to the accompanying drawings. The present invention may have various embodiments, and modifications and changes may be made therein. Therefore, the present invention will be described in detail with reference to particular embodiments shown in the accompanying drawings. However, it should be understood that there is no intent to limit the present invention to the particular forms, and the present invention should be construed to cover all modifications, equivalents, and/or alternatives falling within the spirit and scope of the present invention. In describing the drawings, similar elements are designated by similar reference numerals.

Herein, the terms "include" and "may include" refer to the existence of a corresponding function, operation, or constituent element, and do not limit one or more additional functions, operations, or constituent elements. Further, "include" or "have" may be construed to refer to a certain characteristic, number, step, operation, constituent element, component or a combination thereof, but may not be construed to exclude the existence of or a possibility of addition of one or more other characteristics, numbers, steps, operations, constituent elements, components or combinations thereof.

Further, the terms "or", "at least one of", and "and/or" include any or all combinations of words enumerated together. For example, the expression "A or B" may include A, may include B, or may include both A and B.

Unless otherwise defined, all terms including technical and/or scientific terms used herein have the same meanings as commonly understood by one of ordinary skill in the art to which the invention pertains. In addition, unless otherwise defined, all terms defined in generally used dictionaries are not to be overly interpreted.

Herein, the term "user" may refer to a person or a device, e.g., an artificial intelligence device, that uses an electronic device.

FIG. 1 illustrates an electronic device according to an embodiment of the present invention.

Referring to FIG. 1, the electronic device includes a display 110, an input unit 120, a storage unit 130, an audio processing unit 140, an interface 150, a communication unit 160 and a controller 170.

The display 110 may be implemented with a Liquid Crystal Display (LCD), an Organic Light Emitting Diode (OLED), an Active Matrix Organic Light Emitting Diode (AMOLED), etc. The display 110 displays various information such as menus of the electronic device, input data, function setup information, etc. The display 110 may display information corresponding to a function running in the foreground. The display 110 may also display both a task running in the foreground and a task running in the background, according to a user's request.

The input unit 120 may receive various types of user inputs to control the operations of the electronic device. For example, while a plurality of sound content are simultaneously output during a search operation, the input unit 120 may receive a user input for returning to main content (first content) running in the foreground. The input unit 120 may also receive user inputs for switching between an application running in the background and an application running in the foreground, and for switching between applications running in the background.

The storage unit 130 may store programs and data for operations of the electronic device. For example, the storage unit 130 may store information about sound volume values respectively allocated to foreground and background tasks (or applications). The storage unit 130 may also store a program for switching between a foreground task and a background task and for selecting a background task.

In addition, the storage unit 130 may store programs and instructions related to a content search operation and an operation for returning to the main content according to a preset user input.

The audio processing unit 140 may process the input and output of audio-related data. For example, the audio processing unit 140 may include a microphone, a speaker, etc.

The audio processing unit 140 may output sound related to content or a task executed in a foreground or background at different volumes, according to whether the content or task is executed in the background or foreground. For example, when the foreground has been set to 100% of the sound volume value and the background has been set to 50%, a call function executed in the foreground may output a sound at 100% of the volume, and a DMB function in the background may output a sound at 50% of the volume.

The interface 150 may transfer, to the controller 170, instructions or data that the user enters through an auxiliary input/output system (e.g., a sensor, keyboard, earphones, etc.). For example, when a button input is entered through earphones connected to the electronic device, the interface 150 may provide the data corresponding to the button input to the controller 170. In addition, the interface 150 may output instructions or data received from the controller 170, through an auxiliary input/output system (e.g., earphones, etc.). For example, the interface 150 may output sound-related data processed by the controller 170 to the speakers of the earphones.

The communication unit 160 may connect, via a communication link, the electronic device with external electronic devices (e.g., a peripheral electronic device or a server). For example, the communication unit 160 may connect to a network, via a wireless or wired communication link, to communicate with an external electronic device. For example, the wireless communication may include wireless fidelity (WiFi), Bluetooth (BT), near field communication (NFC), a global positioning system (GPS), and/or cellular communication (e.g., long-term evolution (LTE), LTE-Advanced (LTE-A), code division multiple access (CDMA), universal mobile telecommunications system (UMTS), wireless broadband (WiBro), and/or global system for mobile communications (GSM). Examples of the wired communication may include a universal serial bus (USB), a high definition multimedia interface (HDMI), recommended standard 232 (RS-232), and/or a plain old telephone service (POTS).

The communication unit 160 may support wireless or wired communication for executing an application and/or content in the background or foreground.

The controller 170 may control the entire operation of the electronic device and the signal flow between the components in the electronic device. Accordingly, the control module 170 may control content or applications so that the content or applications can be simultaneously executed in both the foreground and background. For example, when a music playback application program is running, the controller 170 may execute song B in the background while song A is running in the foreground. In this case, the control module 170 simultaneously outputs the sound of the content running in the foreground and the sound of the content running in the background, and controls the content so that the sounds can be output at different sound levels respectively preset to the foreground and the background.

In addition, in a multitasking process, the controller 170 may control the audio processing unit 140 so that tasks running in the foreground and background can simultaneously output the sounds at different sound levels. For example, the foreground sound volume value may be greater than the background sound volume value.

In the execution of a single tasking process, when both first content and second content are simultaneously running in the foreground and background with different sound volumes, respectively, when the controller 170 receives a preset, particular user input, it performs control operations so that the simultaneous execution is stopped and only the first content in the foreground is executed. In addition, for an executed content alteration event (e.g., after an expiration of a preset period of time, etc.), the controller 170 may alter relationship of the first and second content, such that the second content will run in the foreground, and sound corresponding to the second content will be output at a volume corresponding to the foreground.

In addition, when different types of applications are simultaneously running in the foreground and background, respectively, when a particular event occurs, the controller 170 may switch between an application running in the foreground and a particular application running in the background. When a plurality of applications are running in the background, the controller 170 may set an application to be executed on the main part of the background based on a user's selection of one of the plurality of applications. For example, the main part of the background may refer to an area where a sound from among a plurality of applications running in the background is output.

For example, although five applications are running in the background, the user may select one of the background applications to output sound with the application running in the foreground. In this case, the background application that outputs sound is referred to as being located in the main part of the background.

Figure 2:
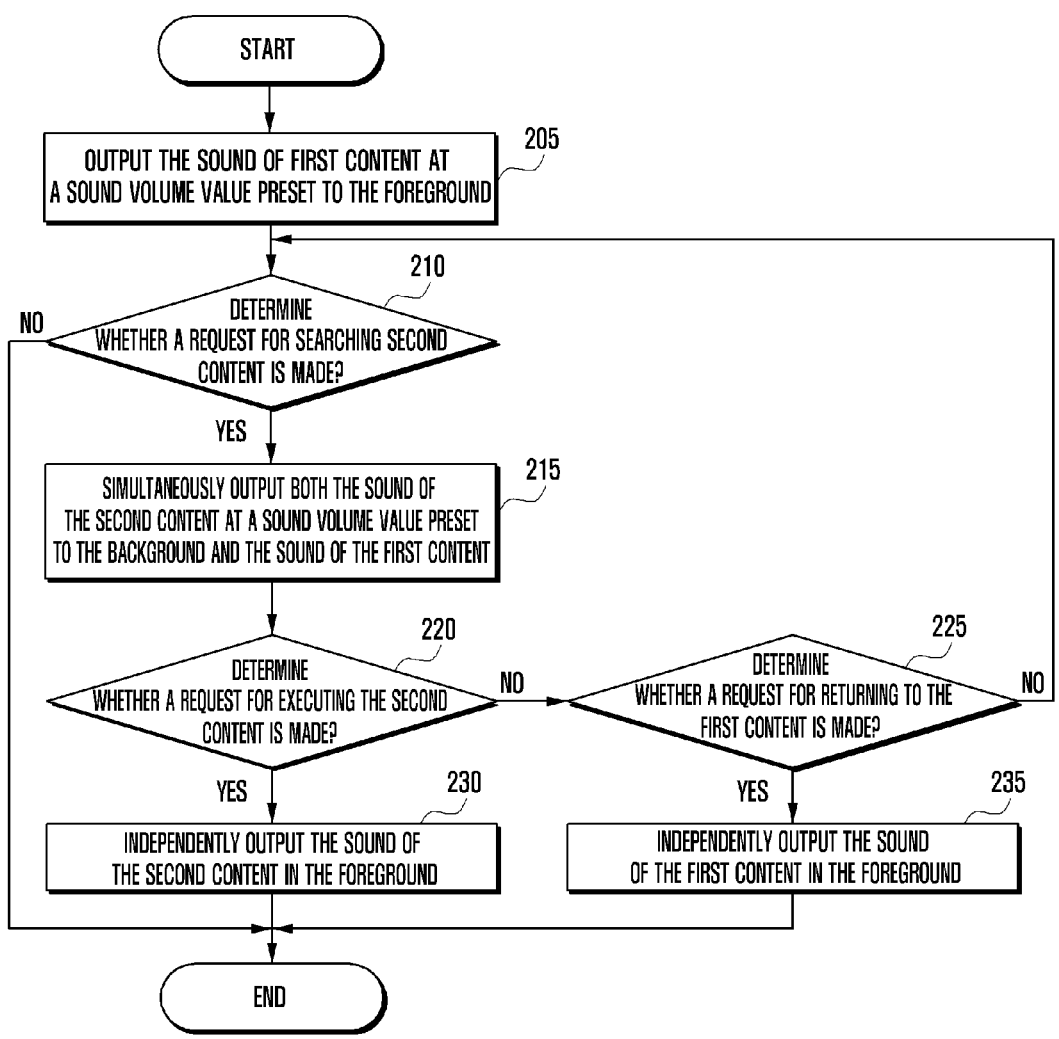
FIG. 2 is a flow chart illustrating a method of executing content in an application according to an embodiment of the present invention.

FIG. 2 is a flow chart illustrating a method of executing content in an application by an electronic device according to an embodiment of the present invention.

Referring to FIG. 2, in step 205, the electronic device outputs a sound of first content at a first sound volume value (e.g., 100%) preset in the foreground.

In step 210, the electronic device determines if a request to search for second content is received.

When the electronic device detects a request to search for second content (e.g., when a user of the electronic device clicks the 'Play/Pause' button of the earphones twice, flicks a cover image corresponding to the first content, etc.) in step 210, the electronic device simultaneously outputs a sound of the second content at a second sound volume value (e.g., 50%) preset in the background, and the sound of the first content, in step 215. For example, the second sound volume value of the background may be set to be less than that of the foreground.

More specifically, when content A is played in the foreground over a preset period of time (e.g., 5 seconds), the electronic device determines content A as the main content (first content) running in the foreground, and simultaneously executes content B (second content) with content A, when a search request is made in the background. However, the sound of content B is output at a lower volume than the sound of content A running in the foreground.

In step 220, the electronic device determines if a request for executing the second content is made, i.e., whether a request is made to output only the sound of the second content in the foreground. For example, the request for executing the second content may be a condition that a preset period of time (e.g., 10 seconds) has elapsed after a simultaneous search execution, a long touch applied to the title of the second content, etc.

When the electronic device determines that a request for executing the second content has been made in step 220, the electronic device independently outputs the sound of the second content in the foreground in step 230.

However, when the electronic device ascertains that a request for executing the second content has not been made in step 220, the electronic device determines if a request to return to the first content is made in step 225. For example, the request to return to the first content may be made by the user clicking the 'Play/Pause' key of the earphones three times, etc.

When the electronic device determines that a request to return to the first content has not been made in step 225, the operation returns to step 210. However, when the electronic device determines that a request to return to the first content has been made in step 225, the electronic device independently outputs the sound of the first content in the foreground in step 235.

Figure 3:
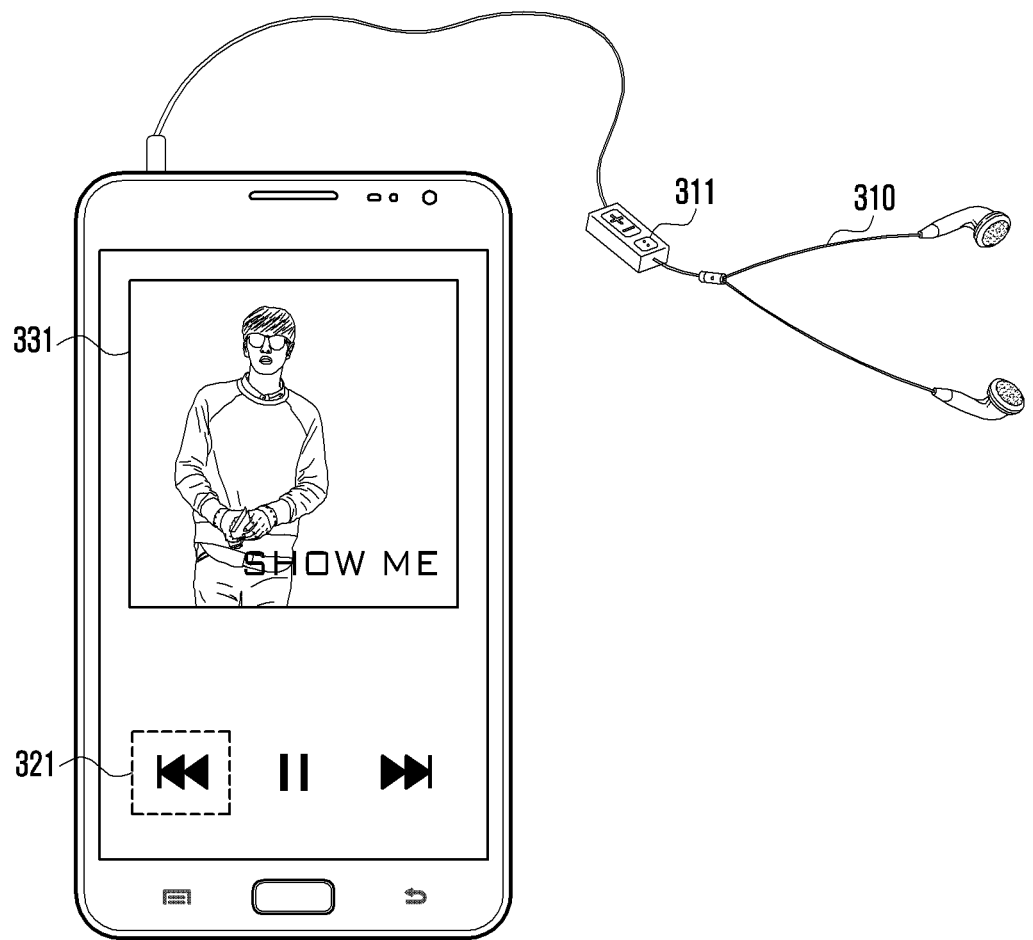
FIG. 3 illustrates a method of entering user inputs for performing functions according to an embodiment of the present invention.

FIG. 3 illustrating a method of entering user inputs for performing functions according to an embodiment of the present invention. For example, the method illustrated in FIG. 3 may be used to enter requests as described in steps 210 and 225 of FIG. 2.

Referring to FIG. 3, to search for the second content, a user may double click a 'Play/Pause' key 311 of the earphones 310, connected to the electronic device. Alternatively, a user may flick a cover image 331 representing the currently executed content.

Although FIG. 3 illustrates different types of user inputs, the present invention is not limited thereto and various other types of user inputs may be used for searching for the second content.

When a request to search the second content is made, content on a content executing list, which follows the content that is currently being executed, may be sequentially executed with the content that is currently being executed.

For example, when the content list includes content A, content B, content C, and content D in order, while content A as the main content (or first content) is currently being executed in the foreground, when a request to search for the second content is made, content B is executed in the background, and sound corresponding to content B is output at a relatively lower volume than content A. When another second content searching request (e.g., flicking the cover image 331) is received before the second content executing request is made or the request for returning to the first content is made, content C, i.e., the next content on the content list, is executed in the background instead of content B, and a sound corresponding to content C is output at a relatively lower volume than content A. Similarly, when yet another second content searching request is received, content A will be executed in the foreground and content D will be executed in the background.

To request the stopping of the simultaneous execution of content, in order to independently execute the content (first content) currently running in the foreground, for example, a user may triple click the 'Play/Pause' key of the earphones 310. Alternatively, the user may double click a particular button (e.g., 'Back' button 321) on an application execution screen.

Although FIG. 3 illustrates different types of user inputs, the present invention is not limited thereto and various other types of user inputs may be used for searching for the second content.

In addition, a content execution operation according to an embodiment of the present invention may also be performed in an asynchronous sound output mode. For example, when first content of an application is being output in the foreground a preset volume and a request to search for second content is made, the sound of the second content may be independently output from the background at a volume that may be equal to or differ from the volume preset in the foreground. Thereafter, when a request to returning to the first content (or main content) is made, the sound of the first content (or main content) may be independently output from the foreground again. In order to independently output the sound of the first content in the foreground according to the returning request, an event for executing the second content in the foreground does not need to occur. However, when a second content executing event for outputting the sound of the second content in the foreground content has occurred, because the second content has been set as the main content, although an event for the returning request (e.g., clicking 'Play/Pause' key three times) occurs, the sound of the second content that is currently running may be output without interruption.

Figure 4:
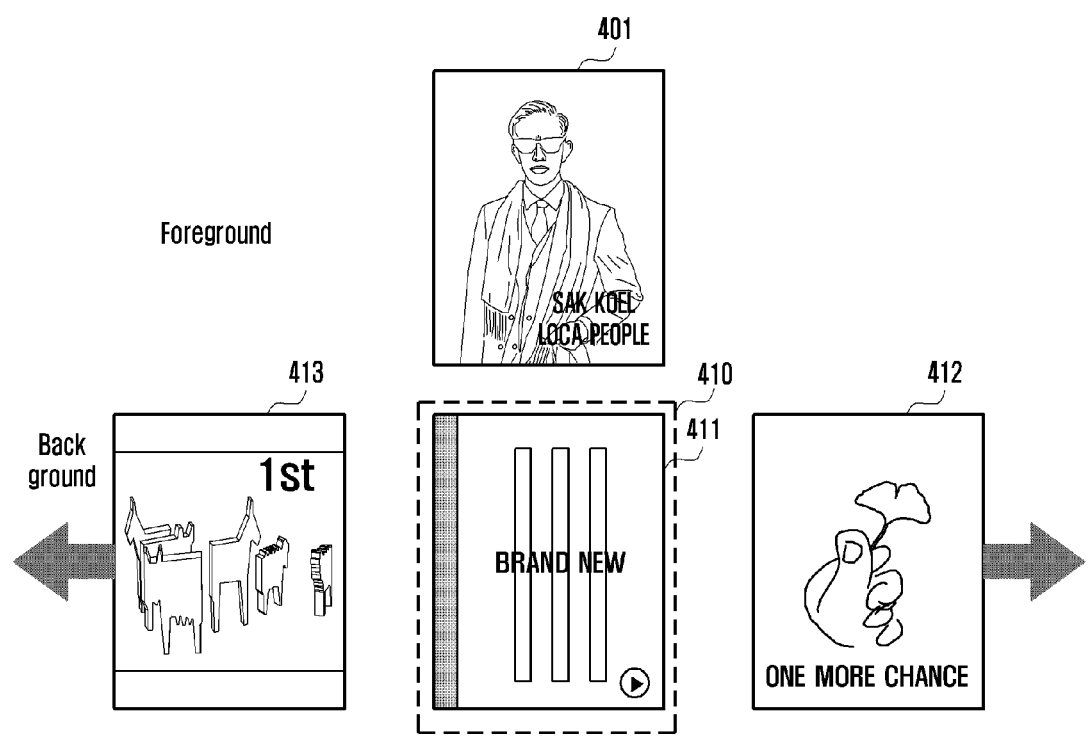
FIG. 4 illustrates examples of screens displayed during a method of executing content according to an embodiment of the present invention.

FIG. 4 illustrates examples of screens displayed during a method of executing content according to an embodiment of the present invention.

Referring to FIG. 4, reference number 401 indicates content running in the foreground. Reference numbers 411, 412 and 413 indicate content on a content execution list, which are running in the background. In FIG. 4, although content 411 is selected as the background main 410, the background main 410 may be any one of the content 411 to 413 in the background, which output sound.

In FIG. 4, content 401 and content 411 are currently outputting sounds, wherein the volume preset to the foreground (content 401) is greater than the volume preset to the background (content 411).

When the second content searching request is made once again, content corresponding to the current background main 410 may be changed from content 411 to content 412.

Figure 5:
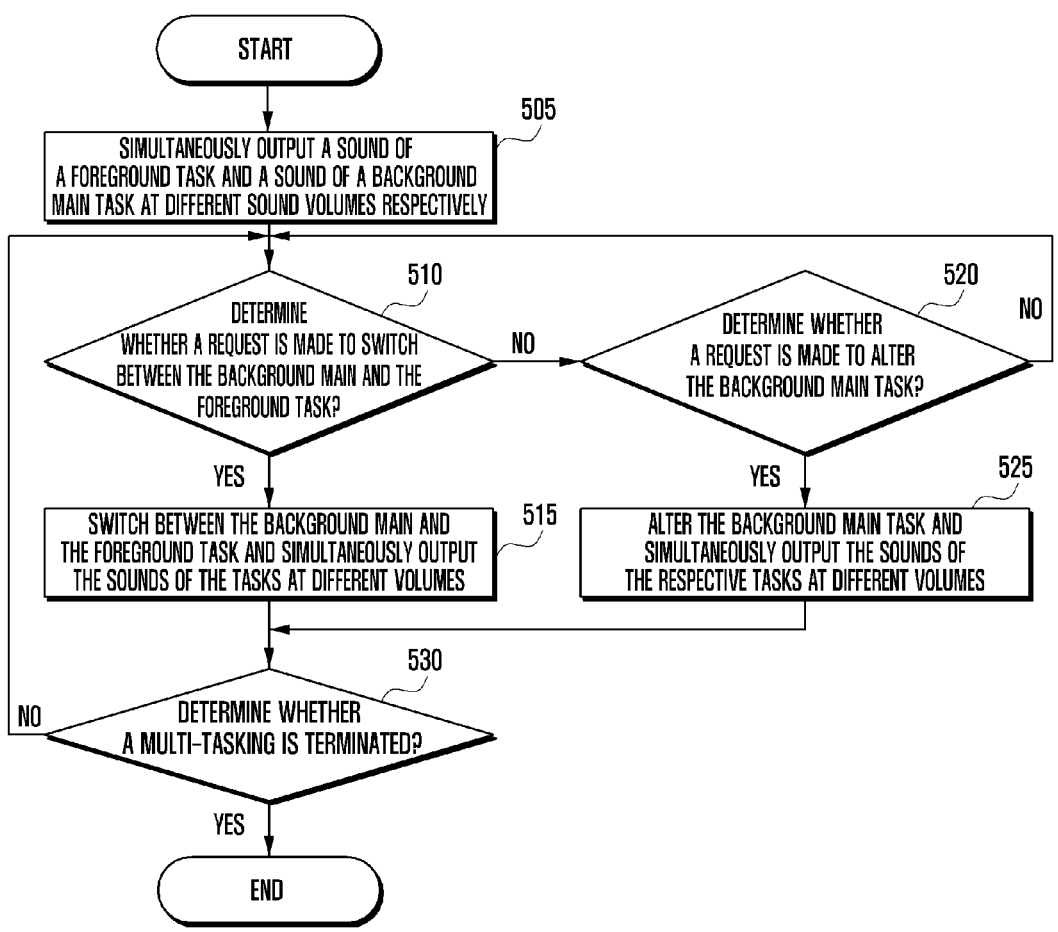
FIG. 5 is a flow chart illustrating a method of executing a plurality of tasks according to an embodiment of the present invention.

FIG. 5 is a flow chart illustrating a method of executing a plurality of tasks by an electronic device according to an embodiment of the present invention.

Referring to FIG. 5, in a multi-tasking environment, the electronic device simultaneously outputs a sound of a foreground task and a sound of a background main task at different respective volumes in step 505. For example, volume set to the foreground may be greater than that of the background. That is, the volume of a task (e.g., a call function application) executed in the foreground may be greater than that of a task (e.g., a game application) executed in the background main. As described above, the background main is a task selected from tasks of the background. That is, when it is assumed that a plurality of tasks are running in the background, one of the tasks may by selected as the background main to output sound. Therefore, although tasks that are not performed in the background main are running on the background, the sounds are not being output.

In step 510, the electronic device determines if a request is made to switch between a task selected as the background main and a task of the foreground.

When the electronic device determines that a request is made to switch between the background main and the foreground task in step 510, the electronic device determines switches between the background main and the foreground task and simultaneously outputs the sounds of the tasks at different volumes set to the respective areas in step 515.

However, when a request has not been made to switch between the background main and the foreground task in step 510, the electronic device determines if a request is made to alter the background main task in step 520.

When a request has been made to alter the background main task in step 520, the electronic device alters the background main task and simultaneously outputs the sounds of the tasks at different volumes set to the respective areas in step 525.

After performing steps 515 and 525, the electronic device determines if a multi-tasking operation is terminated in step 530. For example, the multi-tasking termination may refer to the termination of at least one of a task executed in the background main and a task that is being executed in the foreground.

When the multi-tasking operation is not terminated in step 530, the operation returns to step 510.

When the multi-tasking operation is terminated in step 530, the electronic device terminates the procedure of FIG. 5.

Figure 6A:
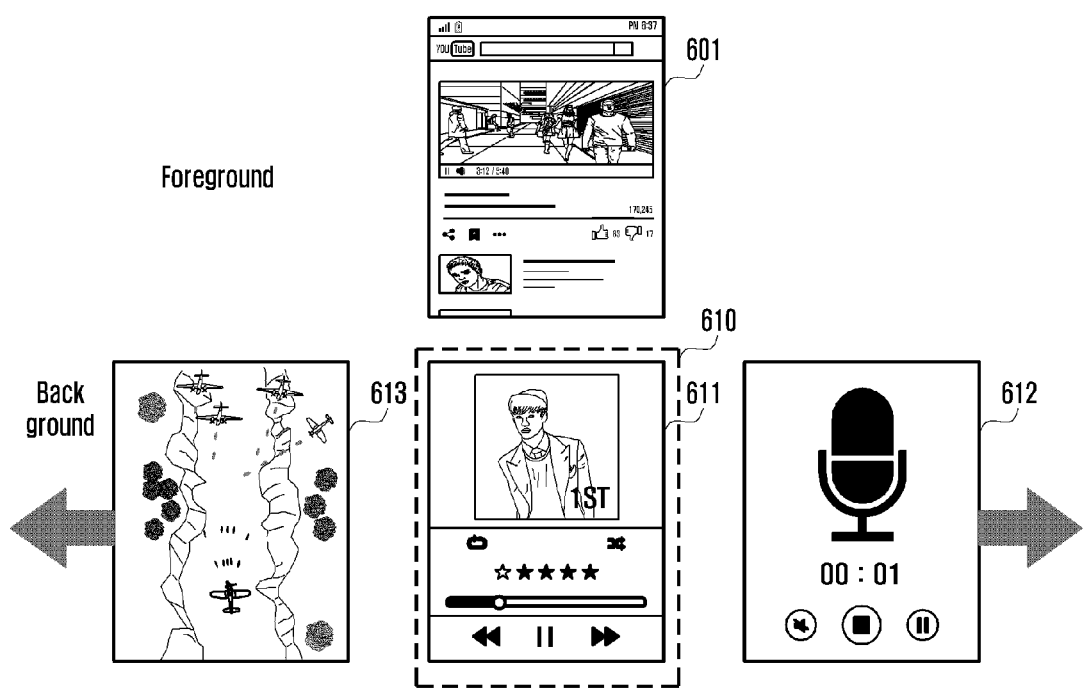
FIGS. 6A and 6B illustrates examples of screens displayed during a method of switching between a task of the foreground and a task of the background according to an embodiment of the present invention.
Figure 6B:
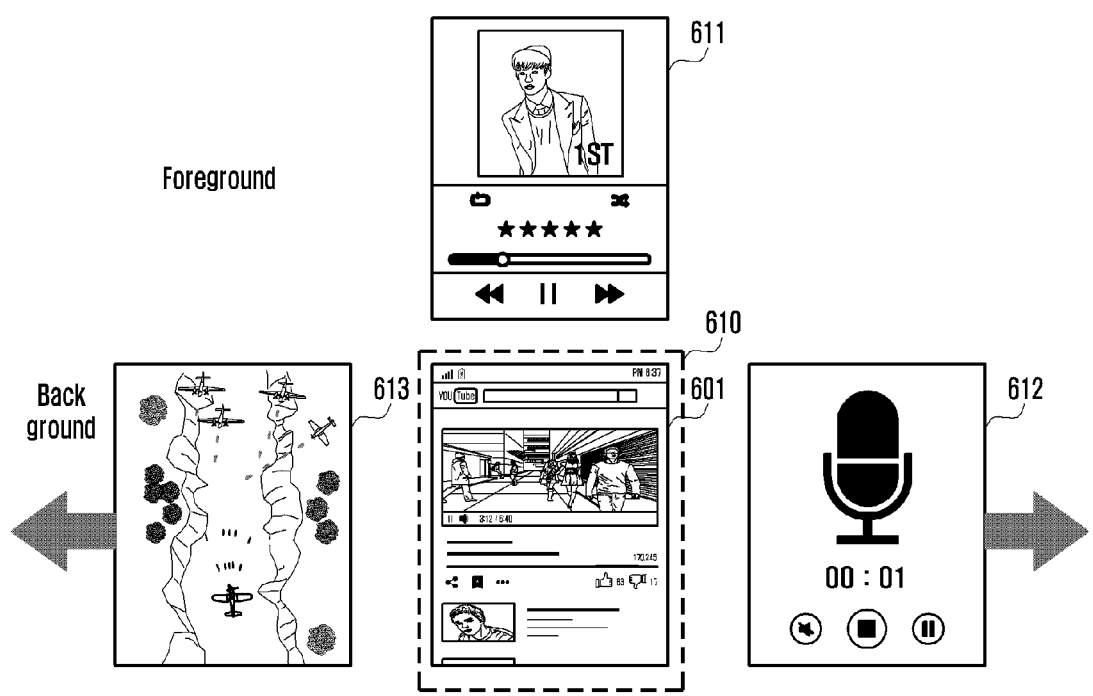

FIGS. 6A and 6B illustrates examples of screens displayed during a method of switching between a task of the foreground and a task of the background according to an embodiment of the present invention. For example, steps 510 and 515 of FIG. 5 may be performed as illustrated in FIGS. 6A and 6B.

Referring to FIGS. 6A and 6B, a task 601 (e.g., a video playback application) is executed in the foreground of a multi-tasking environment, and tasks 611 (e.g., a music playback application), 612 (e.g., an audio record application), and 613 (e.g., a game application) are executed in the background of a multi-tasking environment. Specifically, FIG. 6A illustrates task 611 being executed as the background main 610. According to an embodiment of the present invention, the sound of the task 601 executed in the foreground and the sound of the task 611 selected as the background main 610 may be simultaneously output; and the sound of the foreground task 601 may be output at a greater volume value than that of the background main 610.

When a request is made to switch between a task of the background main and a task of the foreground (e.g., when a user touches a particular button on the touch screen), the tasks may be switched with each other as illustrated in FIG. 6B.

Referring to FIG. 6B, in response to a request for switching between a background main task and a foreground task, the background main task 611 (a music playback application) switches to the foreground, and the foreground task 601 (a video playback application) switches to the background main 610.

Figure 7A:
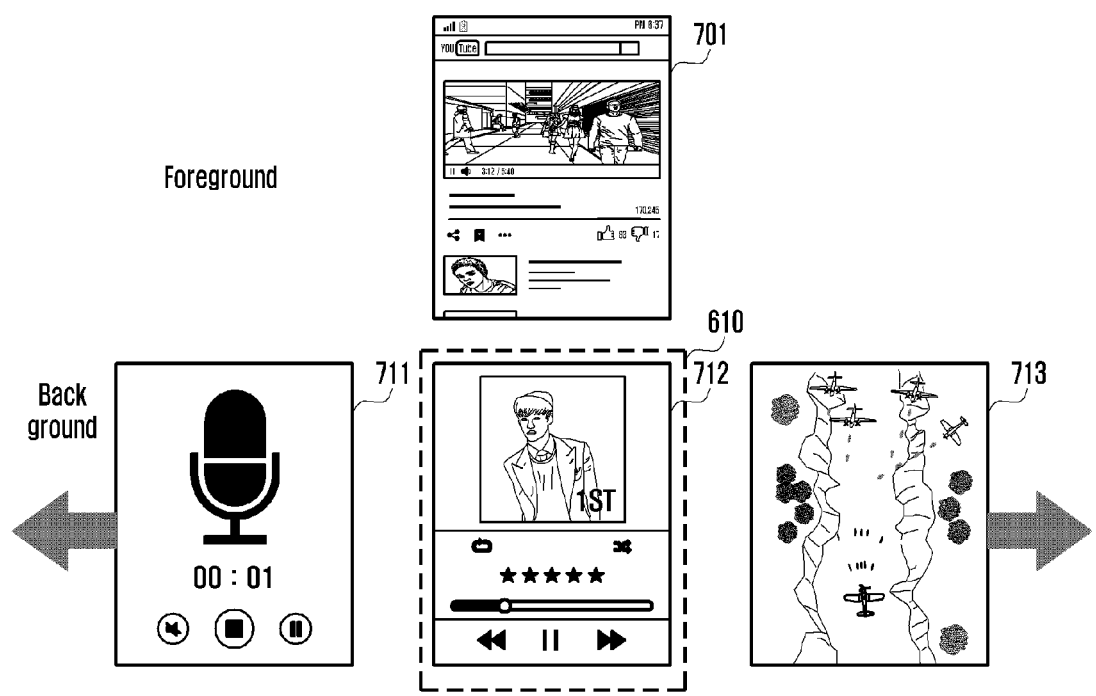
FIGS. 7A and 7B illustrates examples of screens displayed during a method of switching between tasks of the background according to an embodiment of the present invention.
Figure 7B:
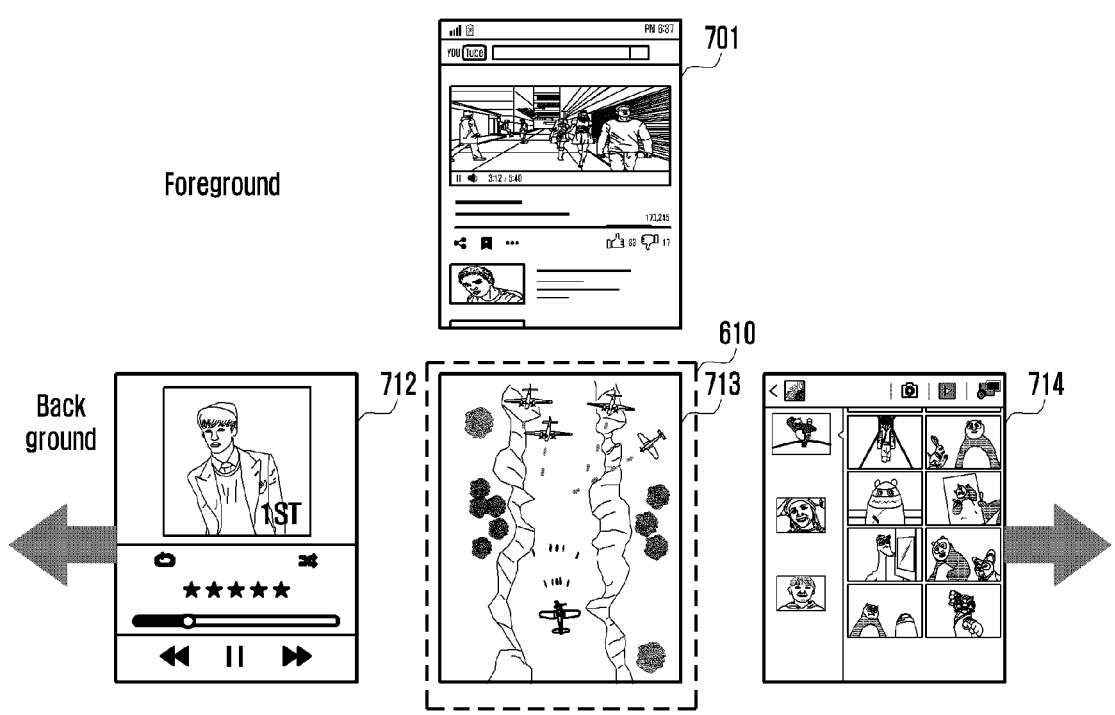

FIGS. 7A and 7B illustrates examples of screens displayed during a method of switching between tasks of the background according to an embodiment of the present invention. For example, steps 520 and 525 of FIG. 5, which are related to selecting one of the tasks running in the background as a task corresponding to the background main, may be performed as illustrated in FIGS. 7A and 7B.

Referring to FIG. 7A, a task 701 (e.g., a video playback application) is executed in the foreground, and task 711 (e.g., an audio recording application), task 712 (e.g., a music playback application), and task 713 (e.g., a game application) are executed in the background. The sound of the task 701 of the foreground is output at a volume preset to the foreground. Only the task 712, which corresponds to the background main 610, outputs sound with the sound of the foreground task. In this case, the sound of the task 712 of the background main 610 is output according to a volume preset to the background. For example, the volume preset to the background may be smaller than that preset to the foreground. Therefore, when tasks are being executed as illustrated in FIG. 7A, the video of task 701 outputs sound at a volume preset to the foreground (e.g., 100%) and the music sound of task 712 is output at a volume preset to the background (e.g., 50%).

The user may perform step 520 to switch the background main 610, e.g., by loading a screen showing all the tasks executed in the foreground and background as corresponding thumbnails, in response to an extended pressing of a home key, and selecting a thumbnail or a task to be set as the background main.

When an alteration (or switch) request is made, the task of the background main 610 may be changed from task 712 to task 713, as illustrated in FIGS. 7A and 7B.

As illustrated in FIG. 7B, when the task of the background main 610 is changed to task 713, only the task running in the background main 610 is changed, without changing the task 701 running in the foreground.

When various embodiments of the present invention search for new content, the above-described embodiments allow a user to preview the new content by simultaneously outputting the sound of the new content at a relatively lower volume, while continuing to play content that has originally been running. As a result, a user can easily manage the content that has originally been running and simultaneously determine the new content to be played.

While simultaneously executing content during a search, various embodiments of the present invention can easily return to an environment where only content that has originally been running is independently executed.

When a plurality of tasks are executed, various embodiments of the present invention can output the sounds of tasks running in the foreground and background at different volumes, alter the respective tasks running in the foreground and background to easily manage the multi-tasking environment, and easily collect information from content executed in the respective tasks.

Modules or programming modules according to various embodiments of the present invention may include one or more components as described above, remove part of them as described above, or include new components. The operations performed by modules, programming modules, or the other components, according to various embodiments of the present invention, may be executed in serial, parallel, repetitive or heuristic fashion. Part of the operations can be executed in any other order, skipped, or executed with additional operations.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed is:

1. An electronic device comprising:
   a display;
   an audio processing unit; and
   a controller configured to:
      control the audio processing unit to output sound of first content from a foreground at a preset foreground volume,
      detect a request to search for second content,
      in response to the detected request, control the audio processing unit to simultaneously output sound of the second content from a background at a preset background volume with the sound of the first content,
      detect a request to select the second content while simultaneously outputting the sounds of the first content and the second content; and
      in response to the request to select the second content, switch the second content to the foreground and control the audio processing unit to output only the sound of the second content from the foreground,
      wherein the preset foreground volume differs from preset background volume.

2. The electronic device of claim 1, further comprising a storage unit for storing the preset foreground volume and the preset background volume,
   wherein the preset foreground volume is greater than the preset background volume.

3. The electronic device of claim 1, wherein the controller is further configured to:
   detect a request to return to the first content while simultaneously outputting the sounds of the first content and the second content; and
   control the audio processing unit to stop outputting the sound of the second content, in response to the request to return to the first content.

4. The electronic device of claim 1, wherein the controller is configured to detect the request to search for the second content when a particular button is pressed a preset number of times.

5. The electronic device of claim 4, wherein the controller is configured to detect the request to select in response to a user input or when the second content is played over a preset period of time.

6. The electronic device of claim 1, wherein the controller is further configured to:
   detect a request to switch between the first content from the foreground and the second content from the background, and
   switch the first content to the background and the second content to the foreground, and control the audio processing unit to simultaneously output the sound of the first content in the background at the preset background volume and the second content in the foreground at the preset foreground volume, in response to detecting the request to switch.

7. The electronic device of claim 1, wherein the controller is further configured to:
   detect a request to alter a background main task, and
   in response to detecting the request to alter, switch the second content from the background to a different second content from the background, and control the audio processing unit to simultaneously output sound of the different second content from the background at the preset background volume with the sound of the first content.

8. The electronic device of claim 7, wherein the background main comprises a task selected from among a plurality of tasks running in the background.

9. A method of searching content, the method comprising:
   outputting sound of first content from a foreground at a preset foreground volume;
   detecting a request to search for second content;
   in response to the detected request, simultaneously outputting sound of the second content from a background at a preset background volume with the sound of the first content;

receiving a request to select the second content while simultaneously outputting the sounds of the first content and the second content; and switching the second content to the foreground and outputting only the sound of the second content from the foreground, in response to the request to select the second content, wherein the preset foreground volume differs from preset background volume.

10. The method of claim 9, further comprising:

receiving a request to return to the first content while simultaneously outputting the sounds of the first content and the second content; and stopping the outputting of the sound of the second content, in response to the request.

11. The method of claim 10, wherein the request to return to the first content comprises pressing a particular button a preset number of times.

12. The method of claim 9, wherein receiving the request to select the second content comprises one of:

detecting a user input for independently outputting the sound of the second content from the foreground; and detecting that the second content is played over a preset period of time.

13. A method of searching for content in a multi-tasking environment the method comprising:

outputting a sound of a first task from a foreground at a preset foreground volume;

detecting a request to search for a second task from a background main, wherein the request to search for the second task from the background main includes an action for flicking a cover image representing currently executed task; and in response to the detected request, simultaneously outputting a sound of the second task from a background main at a preset background volume with the sound of the first task from the foreground, wherein the preset foreground volume is greater than the preset background volume.

14. The method of claim 13, further comprising:

receiving a request to switch between the second task from the background main and the first task of the foreground; and in response to the request, switching the first task to the background main and the second task to the foreground, and simultaneously outputting the sound of the second task at the preset foreground volumes and the first task at the preset background volume.

15. The method of claim 13, further comprising:

receiving a request to alter the second task from the background main;

switching the second task to a different second task in the background main and simultaneously outputting sound of the different second task from the background main at the preset background volume with the sound of the first task, in response to the request.

16. The method of claim 13, wherein the background main comprises a task selected from among a plurality of tasks running in the background.

* * * * *